(12) United States Patent
Plaschkes

(10) Patent No.: US 7,562,421 B2
(45) Date of Patent: Jul. 21, 2009

(54) CONNECTING CLASP

(75) Inventor: Micha Plaschkes, Kibbutz Magen (IL)

(73) Assignee: Magen Eco Energy A.C.S. Ltd., Kibbutz Magen (IL)

( * ) Notice: Subject to any disclaimer, the term of this patent is extended or adjusted under 35 U.S.C. 154(b) by 512 days.

(21) Appl. No.: 11/387,658

(22) Filed: Mar. 23, 2006

(65) Prior Publication Data

US 2006/0219239 A1  Oct. 5, 2006

(30) Foreign Application Priority Data

Apr. 3, 2005  (IL)  ..................... 167824

(51) Int. Cl.
*A44B 21/00* (2006.01)
(52) U.S. Cl. .......................... 24/562; 24/561
(58) Field of Classification Search ............ 24/457, 24/545, 561, 562, 564; 248/49, 58, 68.1; 403/329
See application file for complete search history.

(56) References Cited

U.S. PATENT DOCUMENTS

| 3,485,467 | A | * | 12/1969 | Fuchs et al. | ................. | 24/601.2 |
| 4,858,408 | A | * | 8/1989 | Dunn | ........................ | 24/562 |
| 6,678,920 | B2 | * | 1/2004 | Parker et al. | ................. | 16/415 |
| 6,729,585 | B2 | * | 5/2004 | Ogden | ........................ | 24/545 |

* cited by examiner

*Primary Examiner*—Robert J Sandy
*Assistant Examiner*—Ruth C Rodriguez
(74) *Attorney, Agent, or Firm*—Ladas & Parry LLP

(57) ABSTRACT

There is provided a connecting clasp for joining adjacing modular units of a solar collector mounted on roofs or other surfaces, including two substantially upright walls defining between them a space of a width capable of accommodating the end portions of spacer bars of the solar collector and a plurality of catches with inwards and downwards inclined top faces projecting from inside faces of the two upright walls. By application of force to a spacer bar seatable on the upper edges of the top faces of the catches, the upright walls are spread apart, letting the spacer bars enter the space until the catches snap into recesses provided in the spacer bars, thereby locking the clasp into position.

4 Claims, 2 Drawing Sheets

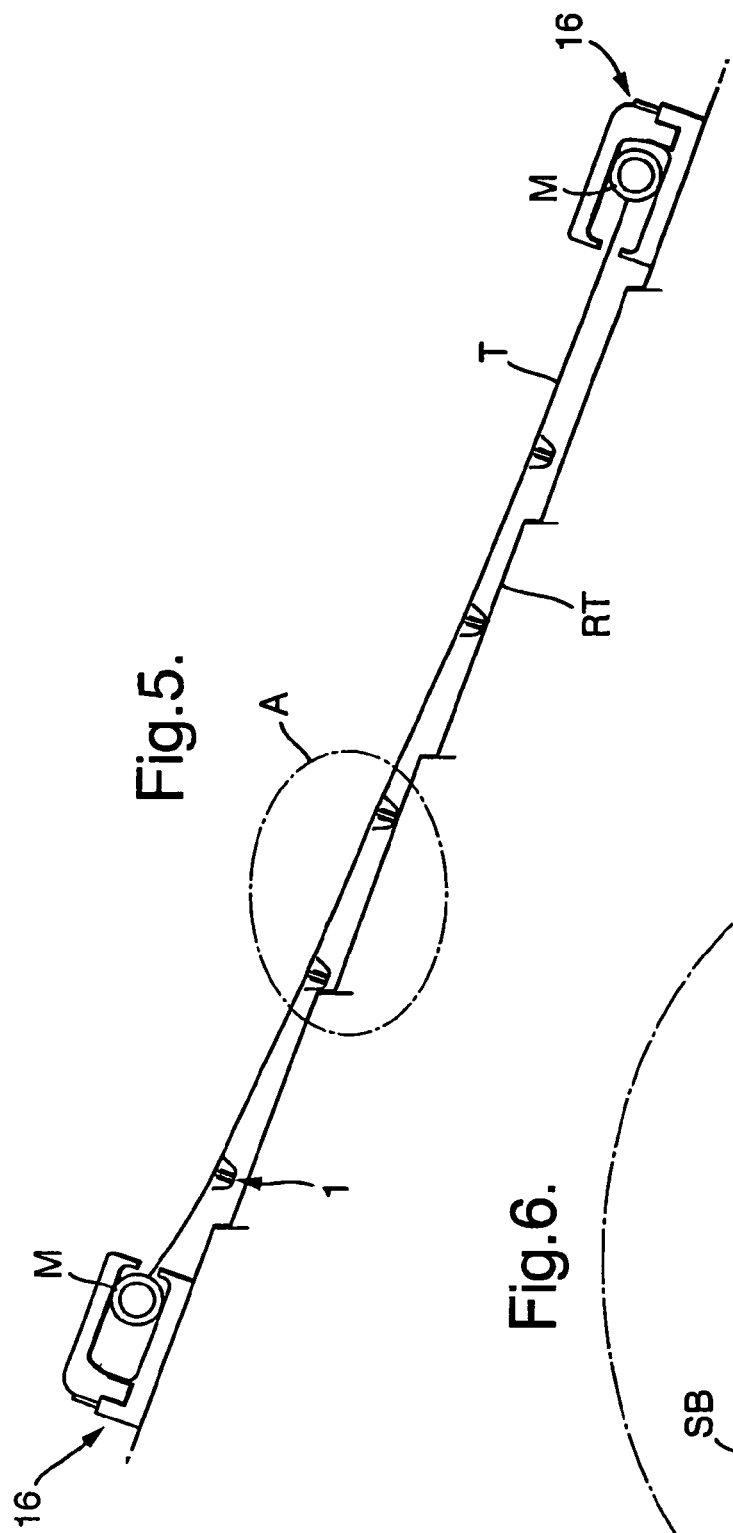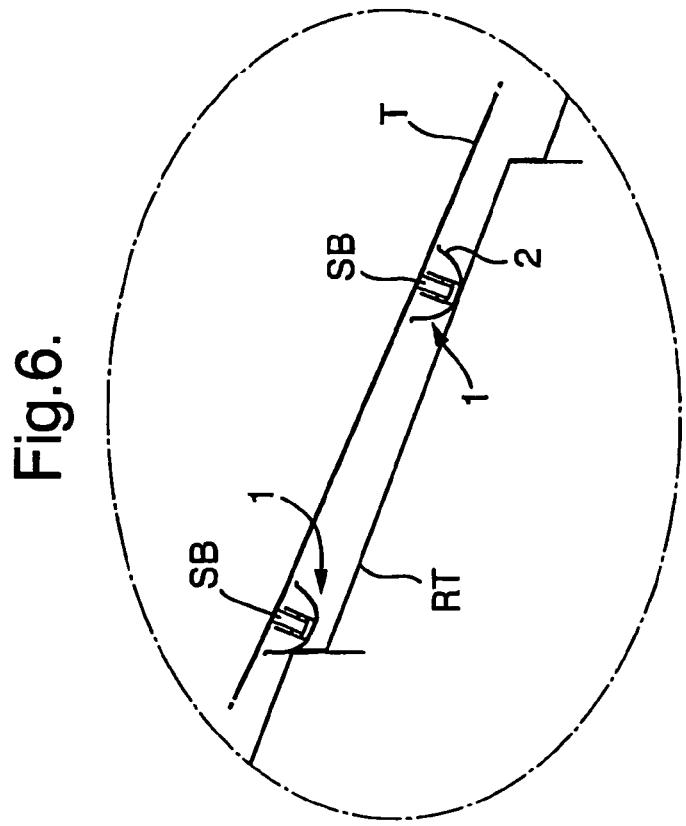

CONNECTING CLASP

FIELD OF THE INVENTION

The present invention relates to a connecting clasp for joining adjacent modular units of a solar collector mounted on roofs or other surfaces.

BACKGROUND OF THE INVENTION

The subject solar collector is preferably a per-se known all-plastic solar collector consisting of modular units comprised of two spaced-apart tubular manifolds, i.e., an inlet manifold and an outlet manifold, interconnected by a plurality of spaced plastic tubulets which, collectively, constitute the active collecting surface of the solar collector.

These basic units are produced to a width of about 30 cm, but may have a length, i.e., a manifold-to-manifold distance of about four meters. To maintain the integrity and orderly appearance of this plurality of tubulets, there are provided further components in the form of a number of spacer bars which, at predetermined intervals, are snapped onto the tubulets of each basic unit. As the narrowest practically useful collector would consist of four basic units, means, per-se known, are provided to produce mechanically strong and hydraulically tight joints between the manifolds of these units.

DISCLOSURE OF THE INVENTION

It is one of the objects of the present invention to provide further means to join several basic units to become fully useable solar collectors, namely a number of connecting or snap-in clasps that, via the above-mentioned spacer bars, will mechanically join adjacent basic units.

It is a further object of the present invention to provide such clasps as will accommodate longitudinal tubulet movement due to thermal expansion or contraction by providing these clasps with means enabling them to slidingly mount steps presented by the lower edges of inclined, overlapping roof tiles.

According to the present invention, this is achieved by providing a connecting clasp for joining adjacing modular units of a solar collector mounted on roofs or other surfaces, comprising two substantially upright walls defining between them a space of a width capable of accommodating the end portions of spacer bars of said solar collector; a plurality of catches with inwards and downwards inclined top faces projecting from inside faces of said two upright walls, characterized in that by application of force to a spacer bar sealable on the upper edges of the top faces of said catches, said upright walls are being spread apart, letting said spacer bars enter said space until said catches snap into recesses provided in said spacer bars, thereby locking said clasp into position.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purpose of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is an enlarged view of a the clasp according to the present invention;

FIG. 2 is an equally enlarged top view of the clasp of FIG. 1;

FIG. 3 is a perspective view of the clasp;

FIG. 4 shows a clasp in the process of being attached to one of the spacer bars (tubulets omitted);

FIG. 5 is a schematic representation of a solar collector on an inclined roof with overlapping roof tiles, and FIG. 6 is an enlarged drawing of detail A in FIG. 5.

DETAILED DESCRIPTION OF THE PREFERRED EMBODIMENTS

Figure 1:
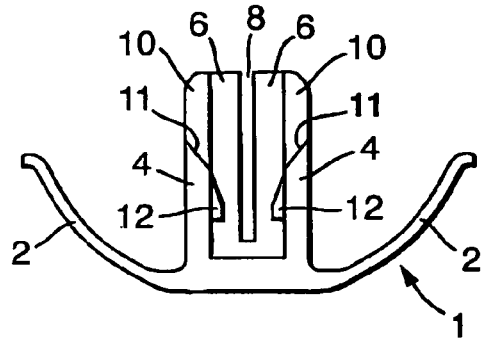
Figure 2:
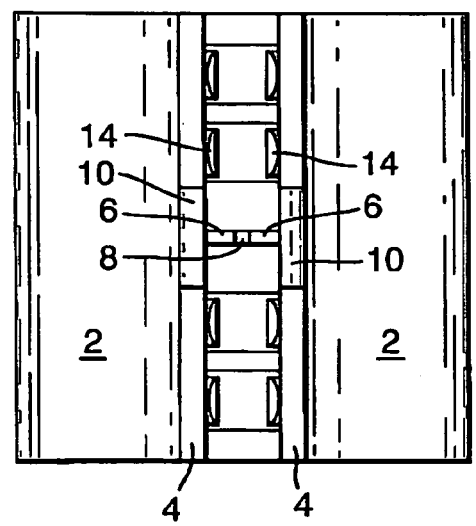

Referring now to the drawings there is seen in FIGS. 1 and 2 connecting clasp 1 according to the invention, showing two optional skids 2 preferably integrally molded with two substantially upright walls 4. Across the middle of walls 4 there extends a thin abutment wall 6 provided with a slot 8. The midsections 10 of walls 4 are somewhat higher than the rest of walls 4, for the purpose of reinforcing abutment wall 6. The upper edges of the lower sections of walls 4 are provided with inwards and downwards inclined chamfers 11.

Also provided are four pairs of catches 12 integrally molded with walls 4, two pairs on each side of wall 6.

Figure 3:
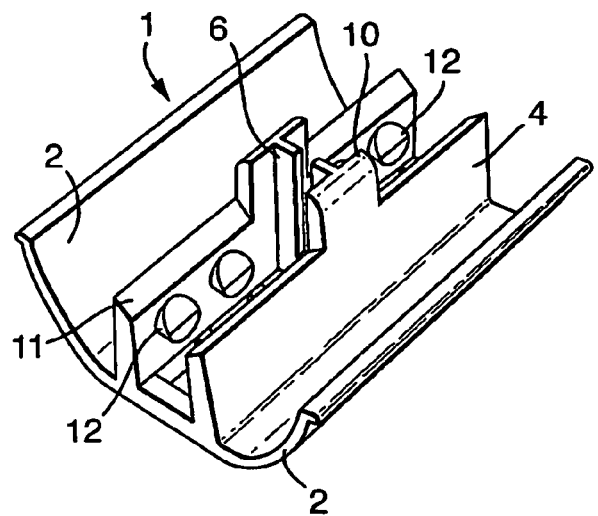

FIG. 3 is a perspective view of clasp 1, clearly showing the details explained in conjunction with FIGS. 1 and 2.

Figure 4:
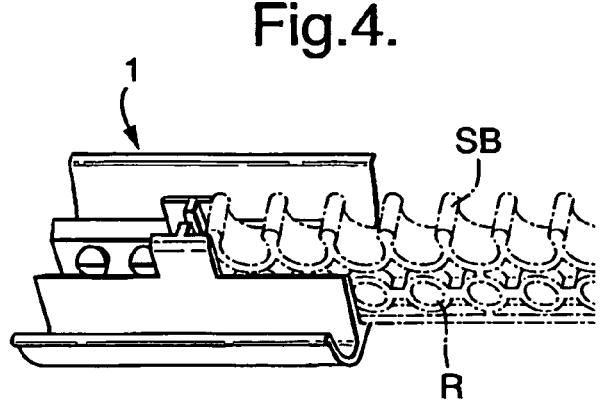

FIG. 4 explains one of the functions of clasp 1 according to the invention, namely the joining of adjacent basic units of the solar collector.

Shown ghosted-in in FIG. 4 there is seen one of the spacer bars SB mentioned above (tubulets not shown).

Spacer bar SB at this stage abutting against abutment wall 6 is seated on the upper edge of the inclined surfaces 14 (FIG. 2) of catches 12. Clasp 1 is advanced in the direction of spacer bar SB until contact is made with abutment wall 6, after which pressure is applied, spreading open walls 4 via inclined surfaces 14, until catches 12 snap into recesses R provided in spacer bars SB, locking the clasp into position.

In the schematic representations of FIGS. 5 and 6, a solar collector is shown mounted on an inclined roof with overlapping roof tiles RT. Seen are manifolds M attached to the roof with the aid of special clamps 16 and interconnected by tubulets T. Also seen in the enlarged detail A of FIG. 6 is a clasp 1 slidingly mounting the step produced by the overlapping roof tiles RT. This is caused by the movement produced by the thermal expansion and contraction of tubulets T.

While in principle it would be possible to make do with one skid only, two skids provide full symmetry, greatly simplifying assembly procedures.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A connecting clasp for joining adjacent modular units of a solar collector mounted on roofs or other surfaces, comprising:
- two substantially upright walls defining between them a space of a width capable of accommodating the end portions of spacer bars of said solar collector;
- a plurality of catches with inwards and downwards inclined top faces projecting from inside faces of said two upright walls; and
- a slotted wall extending across the longitudinal extent of said space and serving as abutment wall for said spacer bars;
- characterized in that by application of force to a spacer bar seatable on the upper edges of the top faces of said catches, said upright walls are being spread apart, letting said spacer bars enter said space until said catches snap into recesses provided in said spacer bars, thereby locking said clasp into position.

2. The clasp as claimed in claim 1, wherein a portion of the midsections of said upright walls is higher than the rest of said walls.

3. The clasp as claimed in claim 2, wherein the upper edges of the lower sections of said upright walls are provided with inwards and downwards inclined chamfers.

4. The clasp as claimed in claim 1, wherein there is further provided at least one skid.

* * * * *